US006015131A

United States Patent [19]

Brewer, III

[11] Patent Number: 6,015,131

[45] **Date of Patent: *Jan. 18, 2000**

[54] COMPOSITE VIBRATION MOUNT

[75] Inventor: Charles R. Brewer, III, Farmington, N.Y.

[73] Assignee: Xerox Corporation, Stamford, Conn.

[ * ] Notice: This patent is subject to a terminal disclaimer.

[21] Appl. No.: 09/053,791

[22] Filed: Apr. 2, 1998

[51] Int. Cl.[7] ..... F16M 1/00

[52] U.S. Cl. ..... 248/638; 248/346.05; 248/421; 248/656; 254/10 C

[58] Field of Search ..... 248/632, 638, 248/669, 676, 421, 346.05, 346.06; 114/270; 254/10 C, 126

[56] References Cited

U.S. PATENT DOCUMENTS

| | | | |
|---|---|---|---|
| 1,032,453 | 7/1912 | Unger | 254/10 C |
| 1,440,498 | 1/1923 | Shurtleff | 248/632 |
| 2,357,120 | 8/1944 | Kuebert et al. | 248/632 |
| 2,587,067 | 2/1952 | Sachtleber | 254/10 C |
| 2,624,535 | 1/1953 | Bollhoefer | 248/669 |
| 2,634,069 | 4/1953 | Drake et al. | 248/632 X |
| 2,840,346 | 6/1958 | Du Moulin | 248/10 C |
| 4,941,797 | 7/1990 | Smillie, III | 254/126 X |
| 5,049,929 | 9/1991 | Anderson et al. . | |
| 5,277,554 | 1/1994 | Elson | 248/638 X |
| 5,306,121 | 4/1994 | Heflin et al. | 248/638 X |
| 5,560,313 | 10/1996 | Brewer, III et al. . | |
| 5,890,695 | 4/1999 | Brewer, III | 248/638 |

*Primary Examiner*—Derek J. Berger
*Attorney, Agent, or Firm*—Adltya Krishnan

[57] ABSTRACT

A simple system for mechanically lifting and securing a machine to vibration isolators. The system is unitary, compact, occupies space only under the machine and not protruding from the sides and allows the machine to be completely detached for servicing. The system includes a four bar linkage using two square supporting members as a chassie with the four bar linkage being mounted to vibration isolators that are welded to support plate. The four bar linkage is manipulated by two screws to easily and quickly raise the machine off its casters and restrain it in a fixed position. The two screws make detachment from the four bar linkage a simple and time efficient process for repairpersons.

9 Claims, 3 Drawing Sheets

COMPOSITE VIBRATION MOUNT

BACKGROUND OF THE INVENTION

CROSS-REFERENCE TO RELATED APPLICATIONS

Cross-reference is hereby made to copending and commonly assigned U.S. application Ser. No. 08/827,588 filed Mar. 28, 1997 by Charles R. Brewer, III, and entitled NON-OBTRUSIVE SHIPBOARD VIBRATION MOUNT FOR COPIER/PRINTERS which is incorporated herein by reference to the extent necessary to practice the present invention.

1. Field of the invention

This invention relates to a frame for mounting a machine or other apparatus to a floor of a building or a ship, and more particularly, to a composite shock mount frame for mounting a copier/printer to a building floor or onboard a ship.

2. Description of the prior art

Along with the need to make copies of documents onboard ships came the problem of how to mount the copy making product so as to make producing copies feasible. Unstable copy making products produced unacceptable copy and an unacceptable amount of downtime of the copy making products due to shock with parts being shaken loose and broken, as well as, misregistration of images on copy sheets. Repairpersons have to go through time consuming, costly and difficult procedures in moving the copy making products to gain access to parts thereof that need servicing and then replacing the copy making product in their original position. In addition, there are times when building shake or vibrate in some parts of the United States more than others due to earthquakes, moving traffic, etc. An answer to these problems included shock mounting the copy making products to the ship.

One of the first designs for shock mounting a copier to a ship included permanently attaching the copier to mounts that were welded to the ships deck. If service were needed the copier was either repaired in place (sometimes in very tight quarters) or the machine was taken off the mounts, which could take up to half an hour or more.

In U.S. Pat. No. 5,560,313 a shock mounting assembly is shown for attaching a copier/printer to mounts aboard a Naval vessel. The apparatus includes two steel supporting members attached to the base of the copier/printer that are easily and quickly screwed into two nonparallel shock mount frames with four jack screws to raise the copier/printer off its casters and restrain it in a fixed position. The four jack screws make detachment from the shock mount assembly a simple and time efficient process for repairpersons.

Another design used incorporated a "C" type frame that allowed the machine to be inserted into the frame, attached to the frame, and then the assembly moved and jacked into position. This design required that the machine be attached to a permanent frame before placing into position. Also, the frame configuration prevented machine placement in tight quarters otherwise the frame would not clear the welded deck mounts if moved into position and no side movement allowed Other designs incorporate a heavy wound spring inside a woven steel sleeve. This is laid out on its side and the machine is permanently attached to the spring. (similar to a slinky laying on its side) Again, the machine is either serviced in place or removed, involving time and energy to remove and replace back onto the mount.

SUMMARY OF THE INVENTION

Accordingly, disclosed herein is a simple system for mechanically lifting and securing a copier/printer to vibration isolators aboard a Naval vessel. The system includes a composite mechanism that is compact, occupying space only under the copier/printer and not protruding from the sides and allows the copier/printer to completely detach for servicing. The system includes a four bar linkage using two square supporting members as the chassie with the supporting members being mounted to weldment frame members that are in turn mounted to vibration isolators that are attached to a pair of plates which are attached to the deck of the vessel. The four bar linkage is manipulated by two screws to easily and quickly raise the copier/printer off its casters and restrain it in a fixed position. The two screws make detachment from the four bar linkage a simple and time efficient process for repairpersons.

BRIEF DESCRIPTION OF THE DRAWINGS

All of the above-mentioned features and other advantages will be apparent from the example of one specific apparatus and its operation described hereinbelow. The invention will be better understood by reference to the folding description of this one specific embodiment thereof, which includes the following drawing figures (approximately to scale) wherein.

DETAILED DESCRIPTION OF THE INVENTION

Figure 1:
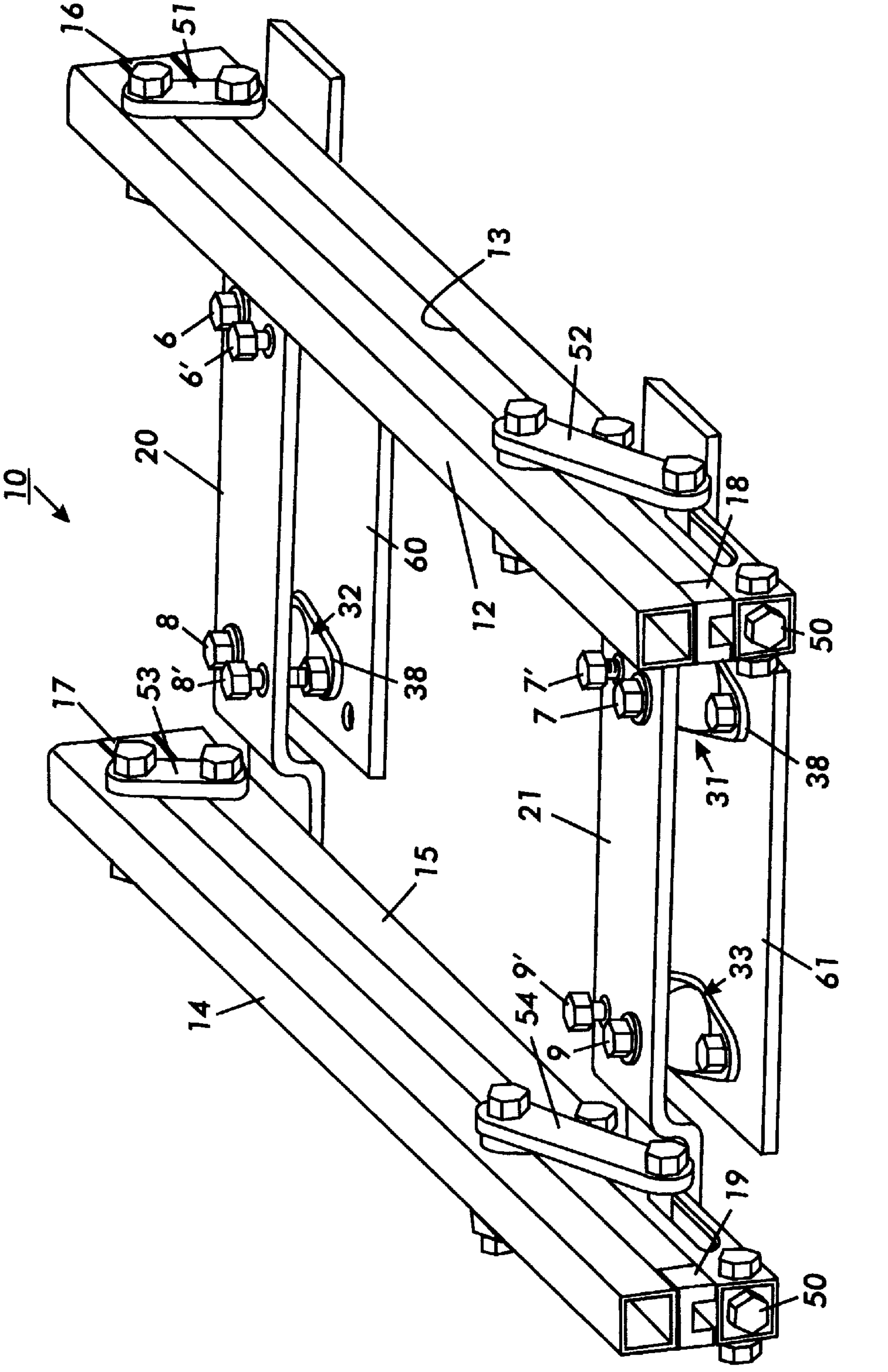
FIG. 1 is a schematic isometric view of the composite vibration mount assembly of the present invention.

For a general understanding of the features of the present invention, reference is made to the drawings. In the drawings, like reference numerals have been used throughout to identify identical elements. Referring to FIG. 1, there is shown an electrophotographic printing machine 5 composed of a plurality of programmable components and sub-systems which cooperate to carry out the copying or printing programs through a touch dialogue User Interface. However, it should be understood that the vibration mount assembly of the present invention can be used with any machine that requires stabilizing onboard a ship or in a building.

Exemplary, conventional machine 5 partially shown here U.S. Pat. No. 5,049,929 which is incorporated herein by reference, employs a recirculating document handler having a document support surface onto which documents are placed. The documents are fed individually to an imaging station where they are imaged onto a photoconductive belt corresponding to the informational areas contained within a document at the imaging station. After imaging, each document is returned to the document handler support surface via a simplex path when either a simplex copy or the first pass of a duplex copy is being made or via a duplex path when a duplex copy is being made. Each image is developed on the photoreceptor, transferred and fused to copy sheets fed from a paper tray to an output tray or finisher. As a set of original document is loaded into the document handler, each document is transported by the document handler to the top of processor where copies are made. Upon completion, the original document will be transported back to the top of the document handler.

Figure 2:
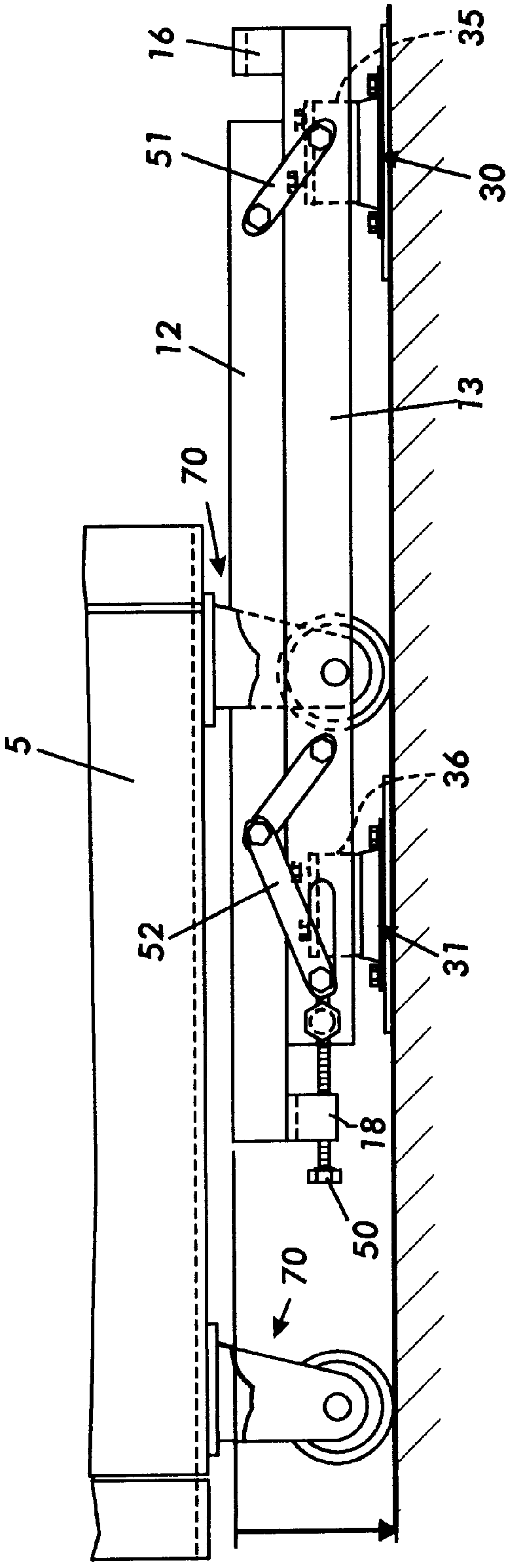
FIG. 2 is a partial, side view showing an electrophotographic machine in the process of being positioned over the composite shock mount assembly of FIG. 1 with the co site shock mount assembly in a down position.
Figure 3:
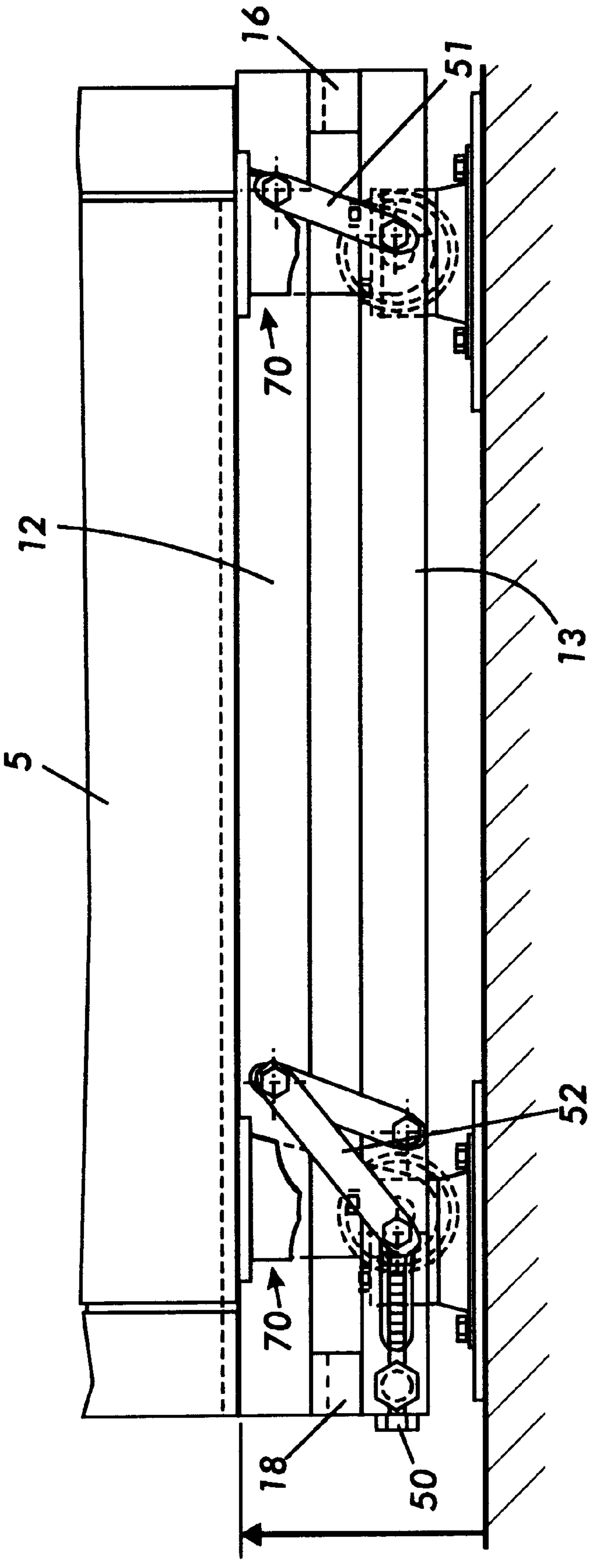
FIG. 3 is an enlarged, partial side view of the composite shock mount assembly shown in FIG. 2 with the four bar linkage expanded into its copier/printer anti-vibration position.

As shown in FIGS. 1–3, and in accordance with the present invention, a composite, unitary and singular vibration mount system 10 comprises a four bar linkage mechanism of square tubes 12, 13, 14, and 15 with two of the tubes 12 and 14 serving as the chassis for mounting the copier/printer 5. Weldment frame members 20 and 21 are positioned orthogonally with respect to square shaped tubes 13 and 15 and support the tubes. Weldments 20 and 21 are attached to vibration isolators 30, 31 and 32, 33, respectively, that are adapted to be attached to a vessel or building floor (not shown) by welding, tie down bolts 6, 7, 8 and 9 or other conventional means. Bolts 6', 7', 8' and 9' are used to connect machine 5 to the vibration mount 10, if desired. Vibration isolators 31 and 32 of FIG. 1 include insulative, rubber-like boots 35 and 36, anchor members 38 and tie down bolts 7 and 8. Vibration isolators 30 and 33 are identical in make-up to vibration isolators 31 and 32 and are mounted upon two large plates 60 and 61 that in turn support weldment frame members 20 and 21 that utilizes two lifting mechanisms of the four bar linkage mechanism. These lifting mechanisms comprise driving bolts 50 that are threaded into both tubes 13 and 15 and conventionally, drivingly connected to linkage members 51 and 52 that are pivoted on the outside surfaces of tubes 13 and 15 to the right in FIG. 3 when driving bolt 50 is rotated clockwise. This separates tubes 13 and 15 from tubes 12 and 14 while simultaneously lifting machine 5 off its casters 70 isolating it from external sources, i.e., vessel's deck or floor in an office experincing a strong ground motion. Rotation of driving bolt 50 counterclockwise brings the tubes together and at the same time places casters 70 of the machine back onto the deck of a vessel or floor of a building. This configuration allows the machine to be easily detached from the vibration isolators and rolled away from the stationary vibration mount assembly 10 for repair by a technician, as well as, maintains stability of the machine when vibration occurs. The vibration mount system 10 is configured such that when the copier/printer 5 is attached to the vibration mount, the machine base is reinforced by the welded structure of the vibration mount and as the machine is raised or lowered for servicing, it moves as a unit.

In operation of the vibration mount assembly 10, a machine 5 is rolled over the top of tubes 12 and 14. Then the two driving bolts 50 in the front of each tube 12 and 14 are rotated clockwise, driving the linkage 51, 52, 53 and 54 up and over center and coming to rest on blocks 16, 17, 18 and 19 attached to opposite ends of the tubes as shown in FIGS. 1 and 3. This allows the machine to be rolled into place on its own casters, then lifted off its casters and secured on the vibration mount assembly 10. To lower the machine, the driving bolts are rotated counterclockwise until the tubes are retracted and the machine is again resting on its casters as shown in FIG. 2. Advantages of this machine mounting system include: fast mounting and dismounting of the machine onto and off of the tubes by one technician allowing easier servicing of shipboard machines; and no work is needed for attachment to the tubes from behind the machine, therefore, tighter shipboard accommodations will suffice for machine installation.

As will be readily understood from the foregoing description, a method and apparatus for shock mounting a machine to a support member of a vessel or building has been disclosed that provides a simple means of mechanically lifting and securing a copier/printer against vibration. The system enables a technician to dismount and mount the copier/printer with respect to two pairs of tubes in a quick and efficient manner. The tubes are positioned orthogonal to the longest dimension of the copier/printer.

The invention has been described in detail with particular reference to the preferred embodiment thereof, but it will be understood that reasonable variations and modifications are possible without departing from the spirit and basic scope of the invention.

We claim:

1. An apparatus for stabilizing a machine against vibration, comprising:

a unitary, composite, vibration mount that includes two planar support members;

at least four vibration isolators with two each of said at least four vibration isolators positioned on and attached to each of said two plate support members;

a pair of frame members with one each thereof positioned on top of said two each of said four vibration isolators;

at least two pair of attachment members connected to said pair of frame members with one member each of said at least two pair of attachment members being movable from a first position atop the other member of each said at least two pair of attachment members to a second position spaced from said other member of each said at least two pair of attachment members;

a linkage mechanism connecting each of said one member of said at least two pair of attachment members to said other member of each said at least two pair of attachment members for relative movement; and driving bolts connected to said linkage mechanism such that manipulation of said driving bolts clockwise serves to separate the first and second positions said at least two pair or attachment members.

2. The apparatus of claim 1, wherein said two pair of attachment members are tubes.

3. The apparatus of claim 2, wherein said driving bolts include at least two bolts.

4. The apparatus of claim 2, wherein said tubes are made of steel.

5. The apparatus of claim 4, wherein said steel tubes are square.

6. The apparatus of claim 5, wherein each of said vibration isolators include a flexible boot.

7. A unitary, composite, vibration mount, comprising:

a planar support member;

at least four vibration isolators positioned on and attached to said plate support member;

a pair of frame members with one each thereof positioned on top of two each of said four vibration isolators;

at least two pair of attachment members connected to said pair of frame members with one member each of said at least two pair of attachment members being movable from a first position atop the other member of each said at least two pair of attachment members to a second position spaced from said other member of each said at least two pair of attachment members;

a linkage mechanism connecting each of said one member of said at least two pair of attachment members to said other of said at least two pair of attachment members for relative movement; and driving bolts connected to said linkage mechanism such that manipulation of said driving bolts clockwise serves to separate the first and second positions of said at least two pair or attachment members.

8. The apparatus of claim 7, wherein said pair of frame members are positioned orthogonally with respect to said attachment members.

9. The apparatus of claim 8, wherein said at least two pair of attachment members are supported by end portions of said pair of frame members.

* * * * *